United States Patent Office 3,116,965
Patented Jan. 7, 1964

3,116,965
SILATRIOXANE TANNED LEATHER AND THE PRODUCTION THEREOF
Hans H. Ender, Buffalo, N.Y., assignor to Union Carbide Corporation, a corporation of New York
No Drawing. Filed Aug. 27, 1962, Ser. No. 219,783
7 Claims. (Cl. 8—94.21)

This invention relates to a process for tanning and waterproofing leather which employs silatrioxanes as the combination tanning and waterproofing agent.

The silatrioxanes useful in this invention include monosilatrioxanes which have the structure represented by the following formula:

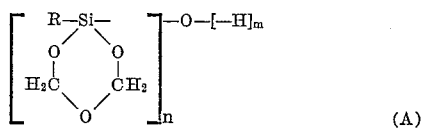

(A)

wherein R is a monovalent hydrocarbon group, preferably containing from 1 to about 10 carbon atoms, $m$ is an integer having a value from 0 to 1, $n$ is an integer having a value from 1 to 2 and the sum of $n$ and $m$ is 2. Thus, the compounds of formula A include cyclic silatrioxanes having the following formulas:

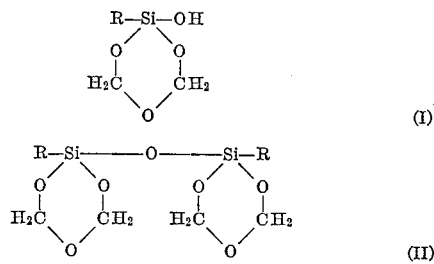

where R is as previously defined.

The compounds useful in this invention include those represented by Formulas I and II where R in each case can be methyl, ethyl, propyl, phenyl, vinyl, allyl, octyl, cyclohexyl, n-butylphenyl, mesityl and the like. In the compounds of Formula II, the two R groups can be different monovalent hydrocarbon groups.

The silatrioxanes of Formula A can be prepared by a process which comprises the reaction of formaldehyde, a monovalent hydrocarbon trichlorosilane, $RSiCl_3$ (where R has the meaning previously defined), and water at a temperature in the range of $-30°$ C. to $60°$ C. and continuously removing hydrogen chloride from the reaction. This reaction is illustrated by the equations:

(B)

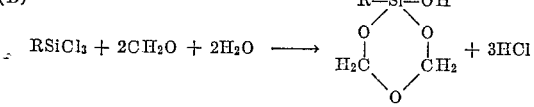

(C)
$2RSiCl_3 + 4CH_2O + 3H_2O \longrightarrow$

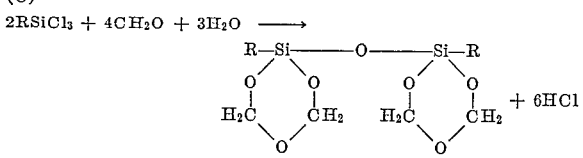

The theoretical molar quantities of trichlorosilane, formaldehyde, and water shown by the above equations are preferred. However, variances can be made in the molar ratios of reactants with the exception of the molar ratio of water to trichlorosilane which should be limited to 3 or less. Even large excesses of $CH_2O$ do not hinder the reaction. Molar ratios of water to trichlorosilane of over 3 are not advantageously employed because of the formation of siloxane polymers thus resulting in lower yields and complications in the recovery of the silatrioxane compounds. The silatrioxane products obtained comprise mixtures of the compounds represented by Formulas I and II along with relatively small quantities of polymeric silatrioxanes. Compounds of the Formulas I and II can be separated from such mixtures as by fractional distillation, or the mixtures themselves can be employed as they are (without fractional distillation) after removal of excess reactants, hydrogen chloride, solvents, and other reagents. When separating the compounds of Formulas I and II from the reaction mixture and from each other, pressures below about 5 mm. Hg are preferred. The higher temperatures required when higher distillation pressures are employed result in some thermal decomposition of the desired products. For example, the compounds of Formulas I and II distill readily at 3 mm. Hg when R is methyl and at 1 mm. Hg when R is vinyl.

In order to obtain a predominance of the compounds represented by Formulas I and II, the respective molar quantities of reactants shown by Equations B and C are preferred although other variances can be employed. Thus, the molar ratio of water to trichlorosilane should not be greater than 3 and the molar ratio of $CH_2O$ to trichlorosilane can be as low as one. When molar ratios of $CH_2O$ to trichlorosilane of less than one are employed, large quantities of polymeric material is obtained in the product. Compound I and Compound II are then separated, if desired, or employed as a mixture.

An advantageous procedure for conducting this process is to slowly add (e.g. in a dropwise manner) a mixture or solution of the trichlorosilane and a hydrogen chloride acceptor to water and a source of formaldehyde which is preferably in solution and cooled by an ice bath or other cooling means. The ensuing reaction is strongly exothermic. Hence, the rate of addition is adjusted to maintain a low temperature consistent with the efficiency of the cooling means in removing heat formed. Usual addition times vary from five minutes to one hour. The reaction is essentially complete after all of the trichlorosilane-hydrogen chloride acceptor mixture of solution has been added. During the reaction a thick slurry may form, for example, when pyridine is employed as the hydrogen chloride acceptor. If such a slurry becomes too thick to permit ease of handling, an ether or other solvent is added any time before, during, or after reaction. After the reaction is complete, extraction of the reaction mixture with ether is performed to recover the products from residues such as pyridine hydrochloride formed during reaction. Other methods such as filtering and/or washing with water can be employed to remove the products from residues. The ether extract is washed with water two or three times or more if necessary. The washing operation should preferably be carried out quickly with cold water, since the desired products undergo some hydrolysis on long contact with water and considerable hydrolysis if the water is hot. Contact with cold water for periods up to 30 minutes does not cause any extensive hydrolysis of the products. The washed extract is then dried with a drying agent, for example, anhydrous $Na_2SO_4$, $CaSO_4$, $CaCl_2$ or crystalline zeolitic molecular sieves, and filtered. The ether of the extract is removed as by evaporation under reduced pressure to yield the products. If necessary, the products are separated as by fractional distillation or used without separation.

Hydrogen chloride acceptors are a convenient means for removing hydrogen chloride from the reaction, although other means, such as pumping off the hydrogen chloride under reduced pressure, are within the skill of workers in the art. Examples of preferred hydrogen chloride acceptors are pyridine, quinoline, alkylated pyridines, and trialkyl amines. Pyridine is the hydrogen chloride acceptor most preferred. The preferred pH range of the reaction mixture is from 4 to 8 with pH's of 6.5 to 8 providing the best yields.

Siloxane polymer formation is strongly encouraged at pH's outside of the range of 4 to 8 resulting in lowered yields of product. Thus, the preferable amount of hydrogen chloride acceptor employed is that which is capable of preventing the pH of the reaction mixture from exceeding the limits of 4 to 8.

A source of formaldehyde is provided for the reaction by any suitable means. Formaldehyde can be bubbled as a gas into the reaction mixture or it can be provided for reaction by formaldehyde donors such as polyoxymethylene (commonly called para-formaldehyde), dimethylol acetone, aqueous solutions of formaldehyde or aliphatic alcoholic solutions of formaldehyde (such as formaldehyde in methanol, ethanol, propanol, butanol, and the like).

Examples of trichlorosilanes which can be employed in the above-described process are methyltrichlorosilane, ethyltrichlorosilane, phenyltrichlorosilane, vinyltrichlorosilane, allyltrichlorosilane, cyclopentyltrichlorosilane, nonyltrichlorosilane, (phenylethyl) trichlorosilane, and the like.

Mixtures of trichlorosilanes can also be employed. For example a mixture of methyltrichlorosilane and ethyltrichlorosilane when used in the above process yields a mixture of five compounds namely the compounds of Formula I where R is methyl and ethyl, the compounds of Formula II where both R groups are methyl and both R groups are ethyl and the compound of Formula II where one R is methyl and one R is ethyl.

Preferred temperatures employed in this process are those in the range of $-10°$ C. to $+10°$ C. although temperatures down to $-30°$ C. and up to $60°$ C. can be employed with, however, a lowering of yields. Pressures have not been found to be particularly critical. However, the use of reduced pressures becomes impractical when any of the reactants are highly volatile.

Solvents are not particularly necessary in this process but their use is preferred in order to provide ease of handling of the reactants and products, ease of reaction and higher yields of product. The solvents are advantageously employed to dissolve the trichlorosilane and hydrogen chloride acceptor (if used) prior to their addition to the formaldehyde and water although they may also be employed to dissolve the formaldehyde and water. The ether solvents such as dimethyl ether, diethyl ether, diisopropyl ether, dioxane, tetrahydrofuran, ethylene glycol dimethyl ether and the like have been found to give the best results. Hydrocarbon and chlorinated hydrocarbon solvents have also proven to be useful but in some specific instances provide difficulties in handling reaction mixtures in which they are employed. For example, benzene freezes at about $5°$ C. and toluene tends to form emulsions. The solvents most preferred are water-immiscible ether solvents such as diethyl ether, diisopropyl ether, methyl butyl ether and the like.

The compounds of Formulas I and II are stable compounds at room temperature. However, Compound I can be converted into Compound II by heating Compound I to a temperature not greater than $120°$ C. and removing water. Heating to temperatures over $120°$ C. brings about polymerization. Thus, an alternate method for preparing Compound II is the heating of Compound I as described above.

The silatrioxanes of Formula A (which includes the compounds of Formulas I and II) are particularly useful as tanning agents for leather, and in addition render the tanned leather water-repellent. The leather is prepared for tanning by any conventional method. The silatrioxane of Formula A is then applied to the leather by any convenient means, for example ($a$) as a solution of the silatrioxane in a volatile, polar, organic solvent such as ethers (including the ethers described hereinabove with reference to solvents for the trichlorosilane and hydrogen chloride acceptors used in the process for producing silatrioxanes) alcohols, ketones and the like, or ($b$) as an aqueous emulsion of the silatrioxane. The concentration of silatrioxane in the solution or emulsion is not critical and can vary over wide limits. The silatrioxane solution or emulsion can be applied to the leather by brushing, spraying and the like, or the leather can be immersed for a short time. The leather to which the silatrioxane has been applied is then dried by conventional procedures. An outstanding property of leather tanned by the above described method is its retention of flexibility even after being heated through the shrinkage temperature in a standard water shrinkage test.

The following examples are presented. In the examples, the commercially available reactant "Methyl Formcel" is a source of formaldehyde composed of 12 weight percent water, 33 weight percent methanol and 55 weight percent dissolved formaldehyde.

Example 1

About 145 grams of Methyl Formcel were placed in a flask fitted with a thermometer, stirrer and dropping funnel and the liquid was cooled to $-20°$ C. About 75 grams of $CH_3SiCl_3$ and about 120 grams of pyridine were mixed in the dropping funnel and this mixture was added slowly to the well stirred Methyl Formcel. A temperature between $-10$ and $0°$ C. was maintained. Soon pyridine hydrochloride precipitated and a slurry formed.

Next 150 grams of isopropyl ether and 500 grams of water were added to the stirred mixture. The mixture was then transferred to a large separatory funnel and the layers were separated. The clear ether layer was then washed twice with water in order to eliminate the remainder of the pyridine hydrochloride and excess pyridine and methanol. The isopropyl ether solution was then dried with anhydrous $CaCl_2$ and filtered. The solvent was then removed by vacuum distillation at $30°$ C., and the vacuum was maintained, after evaporation of the solvent for one hour to eliminate the last traces of pyridine. The resulting product was a colorless oil which was identified by infrared spectrographic and elemental analysis as a mixture containing the two compounds

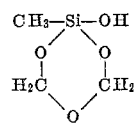

and

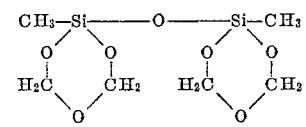

Example 2

Following the procedure of Example 1, about 200 grams of Methyl Formcel were cooled to $-20°$ C. and a mixture of about 140 grams of phenyltrichlorosilane and about 160 grams of pyridine was added slowly to the Methyl Formcel. The temperature was maintained between $-10°$ C. and $0°$ C. during the addition. When the addition was completed about 100 grams of isopropyl ether and about 300 grams of water were added. The ether layer was separated, washed three times with 100 milliliter portions of water, dried and filtered. The ether solvent was then removed under reduced pressure to yield 62 grams of oily product. The oil was found by elemental and infrared spectrographic analysis to contain the compound

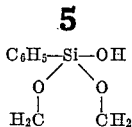

Example 3

Following the procedure of Example 1, a mixture of about 162 grams of vinyltrichlorosilane and about 240 grams of pyridine was added slowly to about 186 grams of Methyl Formcel. The reaction mixture became viscous during the addition of the vinyltrichlorosilane-pyridine solution, and about 200 grams of isopropyl ether were introduced into the reaction vessel before completing this addition. The final reaction mixture was extracted with four 100 gram portions of isopropyl ether. The combined extracts were washed with water, dried and filtered and the solvent was removed under reduced pressure. The product was 130 grams of oily liquid which contained the two compounds

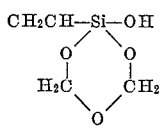

and

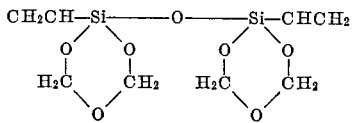

Example 4

A leather tanning solution was prepared comprising diisopropyl ether solvent containing about 25 weight percent of a silatrioxane mixture of

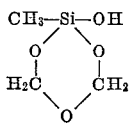

and

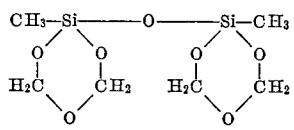

prepared according to the method of Example 1.

A sample of solvent-extracted raw hide was immersed in this solution, drained, and allowed to dry. The leather was uniformly tanned and was water repellent. The tanned sample was subjected to a standard water shrinkage test and the leather remained highly flexible after the shrinkage test.

Example 5

A silatrioxane emulsion useful in this invention has the following composition:

Parts by weight

Silatrioxane having the formula

                                    10

Emulsifying agent (Tergitol Nonionic XD, a polyalkylene glycol ether) _____ 0.5
Water _____ 89.5

The emulsifying agent is dissolved in water. The silatrioxane is added, and the emulsion is formed by any convenient method such as stirring or homogenizing.

Other emulsifying agents can be used, for example, emulsifying and dispersing agents of the non-ionic, cationic, and anionic types such as triethanolamine propanolamine, morpholine, oleic acid, stearic acid, polypropylene glycol monobutyl ether, polyethylene glycol 2-ethylhexyl ether and polyethylene glycol monobutyl ether, esters of polyhydric alcohols such as glycerol monostearate, polyoxyethylenedistearate and propylene glycol monolaurate, or substances such as polyvinyl alcohol, and the like. Nonionic emulsifiers are preferred.

Applying the silatrioxane to the leather in emulsion form has the advantages that previous drying of the skins is not necessary and that the handling of relatively large quantities of volatile solvents is avoided.

This application is a continuation-in-part of copending application Serial No. 57,894, filed September 23, 1960, now United States Patent No. 3,078,293, issued February 19, 1963.

What is claimed is:

1. A process for tanning leather which comprises applying to said leather an organosilicon compound having the formula:

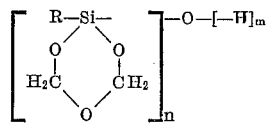

where R is a monovalent hydrocarbon group containing from 1 to about 10 carbon atoms, $m$ is an integer having a value from 0 to 1, $n$ is an integer having a value from 1 to 2, and the sum of $n$ and $m$ is 2.

2. The process in accordance with claim 1 wherein the R group is selected from the class consisting of methyl, phenyl and vinyl.

3. The process in accordance with claim 1 wherein said organosilicon compound is applied to said leather in the form of a solution of said organosilicon compound in a polar, volatile, organic solvent.

4. The process in accordance with claim 1 wherein said organosilicon compound is applied to said leather in the form of an aqueous emulsion of said organosilicon compound.

5. A process for tanning leather which comprises applying to said leather a solution of

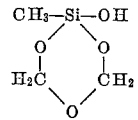

and

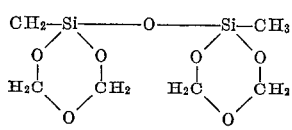

in diisopropyl ether, and thereafter drying said leather.

6. Tanned water repellent leather, said leather having been tanned and rendered water repellent by applying thereto an organosilicon compound having the formula:

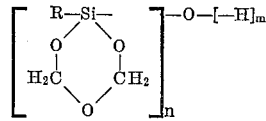

where R is a monovalent hydrocarbon group containing from 1 to about 10 carbon atoms, $m$ is an integer having a value from 0 to 1, $n$ is an integer having a value from 1 to 2, and the sum of $n$ and $m$ is 2.

7. Tanned, water repellent leather, said leather having been tanned and rendered water repellent by applying thereto a solution of
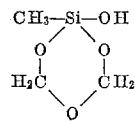
and
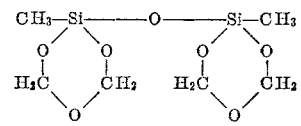
in diisopropyl ether, and thereafter drying said leather.
No references cited.